(12) United States Patent
Hawkins et al.

(10) Patent No.: US 7,930,228 B1
(45) Date of Patent: Apr. 19, 2011

(54) PROMOTING COMPLIANCE BY FINANCIAL INSTITUTIONS WITH DUE DILIGENCE REQUIREMENTS

(76) Inventors: Charles S. Hawkins, Solvang, CA (US); Joseph Hill, Bear, DE (US); Christine E. McLaughlin, Newark, DE (US); Pamela A. Morris, Rutledge, PA (US)

( * ) Notice: Subject to any disclaimer, the term of this patent is extended or adjusted under 35 U.S.C. 154(b) by 0 days.

(21) Appl. No.: 12/019,964

(22) Filed: Jan. 25, 2008

Related U.S. Application Data

(60) Provisional application No. 60/937,901, filed on Jun. 29, 2007.

(51) Int. Cl.
*G06Q 40/00* (2006.01)
(52) U.S. Cl. ............................................. 705/35; 705/1
(58) Field of Classification Search ............... 705/35–45
See application file for complete search history.

(56) References Cited

U.S. PATENT DOCUMENTS

| | | | |
|---|---|---|---|
| 5,101,353 A | 3/1992 | Lupien et al. | |
| 6,014,642 A | 1/2000 | El-Kadi et al. | |
| 6,021,397 A | 2/2000 | Jones et al. | |
| 6,192,347 B1 | 2/2001 | Graff | |
| 6,240,415 B1 | 5/2001 | Blumberg | |
| 6,513,019 B2 | 1/2003 | Lewis | |
| 6,629,081 B1 | 9/2003 | Cornelius et al. | |
| 6,789,078 B2 | 9/2004 | Saitou et al. | |
| 6,853,974 B1 | 2/2005 | Akifuji et al. | |
| 6,856,970 B1 | 2/2005 | Campbell et al. | |
| 6,996,563 B2 | 2/2006 | Kumagai et al. | |
| 7,107,239 B2 | 9/2006 | Graff | |

(Continued)

FOREIGN PATENT DOCUMENTS

JP    09171589 A    6/1997

OTHER PUBLICATIONS

Protiviti Inc., "Guide to U.S. Anti-Money Laundering Requirements Frequently Asked Questions", http://web.archive.org/web/20061026211517/http://www.roberthalfmr.com/External_Sites/downloads/RHMR/rhmr-us/RHMR_Link/financial_reporting/ProtivitiAMLFAQGuidev2.pdf, Oct. 26, 2006, Second Edition, pp. 31-32.*

(Continued)

*Primary Examiner* — Kambiz Abdi
*Assistant Examiner* — Andrew F Sebroski
(74) *Attorney, Agent, or Firm* — K&L Gates LLP

(57) ABSTRACT

Various methods for allowing a due diligence service provider to assist a financial institution with a regulatory or statutory compliance requirement are disclosed. The method may include receiving data from at least one recordkeeping system operatively associated with client accounts of the financial institution, wherein the account data include at least one account of a foreign financial institution; reviewing the account data to identify at least one foreign correspondent account which triggers at least one regulatory or statutory compliance requirement; eliminating account records not associated with a foreign financial institution; and, validating at least part of the account data by communicating a supplemental application to a client of the financial institution to determine applicability of the compliance requirement to the account data. Also, if it is determined that the compliance requirement is applicable to the account data, then a risk assessment may be performed for the account data using a risk ranking tool which applies a risk ranking to the account data. In addition, the method may include monitoring changes in the account data and/or activity in the account at a frequency based at least in part on the applied risk ranking.

22 Claims, 25 Drawing Sheets

U.S. PATENT DOCUMENTS

| | | | |
|---|---|---|---|
| 7,249,080 B1 | 7/2007 | Hoffman et al. | |
| 7,264,154 B2 | 9/2007 | Harris | |
| 7,305,400 B2 | 12/2007 | Keith, Jr. | |
| 7,366,675 B1 | 4/2008 | Walker et al. | |
| 7,376,588 B1 | 5/2008 | Gregov et al. | |
| 7,469,341 B2 | 12/2008 | Edgett et al. | |
| 2001/0034680 A1 | 10/2001 | Purcell | |
| 2001/0042785 A1 | 11/2001 | Walker et al. | |
| 2002/0032642 A1 | 3/2002 | Chichilnisky | |
| 2002/0049705 A1 | 4/2002 | Haviv-Segal et al. | |
| 2002/0087454 A1 | 7/2002 | Calo et al. | |
| 2002/0087455 A1 | 7/2002 | Tsagarakis et al. | |
| 2002/0091635 A1* | 7/2002 | Dilip et al. | 705/39 |
| 2002/0138389 A1 | 9/2002 | Martone et al. | |
| 2002/0184133 A1 | 12/2002 | Zangari et al. | |
| 2003/0040929 A1 | 2/2003 | Knegendorf et al. | |
| 2003/0051164 A1 | 3/2003 | Patton | |
| 2003/0074342 A1 | 4/2003 | Curtis | |
| 2003/0078794 A1 | 4/2003 | Knapp | |
| 2003/0135426 A1 | 7/2003 | Lux | |
| 2003/0154149 A1 | 8/2003 | Gajendragadkar | |
| 2004/0024693 A1 | 2/2004 | Lawrence | |
| 2004/0064329 A1 | 4/2004 | Broad et al. | |
| 2004/0078321 A1 | 4/2004 | Lawrence | |
| 2004/0117302 A1 | 6/2004 | Weichert et al. | |
| 2004/0139111 A1 | 7/2004 | Schoettger et al. | |
| 2004/0254988 A1 | 12/2004 | Rodriguez | |
| 2005/0027611 A1 | 2/2005 | Wharton | |
| 2005/0044037 A1* | 2/2005 | Lawrence et al. | 705/38 |
| 2005/0091524 A1 | 4/2005 | Abe et al. | |
| 2005/0102210 A1 | 5/2005 | Song et al. | |
| 2005/0131752 A1* | 6/2005 | Gracie et al. | 705/10 |
| 2005/0216416 A1 | 9/2005 | Abrams et al. | |
| 2005/0216555 A1 | 9/2005 | English et al. | |
| 2006/0089894 A1 | 4/2006 | Balk et al. | |
| 2008/0262961 A1* | 10/2008 | Dellomo et al. | 705/38 |

OTHER PUBLICATIONS

Federal Financial Institutions Enformcement Counsel, "Bank Secrecy Act Anti-Money Laundering Examination Manual", http://web.archive.org/web/20061007131729/http://www.ffiec.gov/bsa_aml_infobase/pages_manual/OLM_028.htm, Oct. 7, 2006, retrived Nov. 5, 2009.*

Financial Crimes Enformcement Network, "Interagency Interpretive Guidance on Providing Banking Services to Money Services Businesses Operating in the United States", http://web.archive.org/web/20050428145522/http://www.fdic.gov/news/news/financial/2005/fil3205a.html, retrived Nov. 6, 2009.*

"Mantas Anti-Money Laundering," printed from http://www.mantas.com/Products/RegulatoryCompliance/AntiMoneyLaundering.html Internet site, accessed on May 31, 2007, 3 pages.

"Mantas Supports Section 312 of US Patriot Act," printed from http://www.mantas.com/Products/RegulatoryCompliance/USAPA312.html Internet site, accessed on May 31, 2007, 2 pages.

U.S. Appl. No. 10/631,243, filed Jul. 31, 2003.

U.S. Appl. No. 10/631,165, filed Jul. 31, 2003.

U.S. Appl. No. 12/117,387, filed May 8, 2008.

U.S. Appl. No. 11/237,501, filed Sep. 28, 2005.

Notice of Allowance dated Jan. 6, 2009 for U.S. Appl. No. 10/631,165, filed Jul. 31, 2003.

"Customer Identification Program Notice," printed from http://www.tricontinental.com/public/general/cip_notice.html, Internet site, accessed on Aug. 15, 2006, 1 page.

"Bankers Systems, Inc. develops new product packages to help financial institutions comply with USA Patriot Act," Bankers Systems Inc.®, Press Release dated Mar. 4, 2002, printed from http://www.bankerssystems.com/newsroom/Press_Releases/press23.html, Internet site, accessed on Aug. 15, 2006, 3 pages.

"Customer Identification Programs Proposed for Mutual Funds," Investment Company Institute, Jul. 18, 2002, printed from http://www.ici.org/issues/fserv/arc-reg/02_treas_aml_cips.html, Internet site, accessed on Aug. 15, 2006, 2 pages.

Dian Vujovich, "The Patriot Act and Mutual Funds," *My Weekly Column*, printed from http://www.diansfundfreebies.com/other/111003.html, Internet site, accessed on Aug. 15, 2006, 3 pages.

"Customer Identification Programs," printed from http://www.choicepoint.net/ChoicePoint/business/financial/patriotact.html, Internet site, accessed on Aug. 15, 2006, 2 pages.

"New York Bankers Service Corporation Selects Bankers Systems to Help Member Banks Comply with USA Patriot Act," Bankers Systems Inc.®, Press Release dated Sep. 22, 2003, printed from http://www.bankerssystems.com/newsroom/Press_Releases/press55.html, Internet site, accesses on Aug. 15, 2006, 2 pages.

"Bankers Systems adds OFAC WatchDog™ software to its USA Patriot Act solutions," Bankers Systems Inc.®, Press Release dated Jun. 13, 2002, printed from http://www.bankerssystems.com/newsroom/Press_Releases/press29.html, Internet site, accessed on Aug. 15, 2006, 2 pages.

Jessica Pallay, "CIP Hits the Street," dated Oct. 10, 2003, printed from http://www.castlecops.com/modules.php?name=News&file=print&sid=3547, Internet site, accessed on Aug. 15, 2006, 2 pages.

Laura Bruce, "Patriot Act makes banks pry into new accounts," posted Sep. 30, 2003, printed from http://www.bankrate.com/brm/news/bank/20030930a1.asp, Internet site, accessed on Aug. 15, 2006, 6 pages.

"Holistic Compliance," *Wall Street & Technology*, dated Nov. 17, 2003, printed from http://www.wallstreetandtech.com/showArticle.jhtml?articleID=16100954, Internet site,accessed on Aug. 15, 2006, 5 pages.

"PFPC to Tailor AML Tech for Hedge Funds," *Operations Management*, www.operationsmanagement.com, Oct. 13, 2003, p. 5.

Matt Ackermann, "PFPC Offers Funds ID Rule Compliance Help," *American Banker*, Sep. 30, 2003, 2 pages.

"PFPC Offers New Patriot Act Compliance Service for Fund Managers," dated Oct. 7, 2003, printed from http://www.newsdesk.fundnexus.com/newsdesk/newsdesk.asp?StoryID=2234&target=1&rp=1, Internet site, accessed on Oct. 7, 2003, 1 page.

"PFPC Delivers AML System," *Fund Action*, http://www.fundaction.com, dated Oct. 6, 2003, p. 6.

"Tool aids compliance with USA Patriot Act," *InvestmentNews*, Oct. 20, 2003, p. 27.

Tom Leswing, "ICI Surveys Members on Money Laundering Policies," dated Oct. 31, 2003, printed from http://www.ignites.com/home/members/print.article.html?id=974218951, Internet site, accessed on Oct. 31, 2003, 2 pages.

Tom Leswing, "Firms Mostly Up to Speed on Customer ID Regs," dated Oct. 24, 2003, printed from http://www.ignites.com/home/members/print.article.html?id-974218868, Internet site, accessed on Oct. 24, 2003, 2 pages.

"PFPC to Offer Customer Identification Program (CIP) Services," PFPC Press Release dated Sep. 29, 2003, 3 pages.

PFPC, Transfer Agency Division, Customer Identification Program ("CIP") Services Description, Jul. 24, 2003, 3 pages.

PFPC, Transfer Agency Division, Answers to Frequently Asked Questions about Mutual Fund Customer Identification Programs, May 16, 2003, 2 pages.

"Xcitek offers Exchange Data International data via Xcitek.com," printed from http://www.exchange-data.com/products/press/xcitek.asp, Internet site, accessed on Jun. 28, 2002, 3 pages.

"Corporate Actions Processing System," printed from http://www.exchange-data.com/products/corpactprocess.asp, Internet site, accessed on Jun. 28, 2002, 5 pages.

Cristina McEachern, "Raymond James Signs With Xcitek for Corporate Actions Processing," *Wall Street & Technology Magazine*, printed from http://www.wallstreetandtech.com/story/mag/WST20010514S0011, Internet site, accessed on Jun. 27, 2002, 2 pages.

"eActions: A Unique and Exciting Corporate Actions Notification Service," printed from http://www.eactions.hubdata.com/, Internet site, accessed on Jun. 27, 2002, 1 page.

"Meeting the Needs of Growing Advisors," printed from http://www.eactions.hubdata.com/info.asp, Internet site, accessed on Jun. 27, 2002, 2 pages.

"Frequently Asked Questions," printed from http://www.eactions.hubdata.com/faq.asp, Internet site, accessed on Jun. 27, 2002, 2 pages.

"CAMS Corporate Actions Management System," printed from http://www.effsols.com/statichtml/camspg.html, Internet site, accessed on Jun. 11, 2002, 1 page.

"Sponsors," printed from http://www.sia.com/ops2002/html/sponsors.html, Internet site, accessed on Jul. 1, 2002, 10 pages.

Xcitek Consulting Services, Inc., "System Features & Functionality," Sep. 1996, New York, NY, 17 pages.

Xcitek and Solutions Plus, "The Xcitek Solutions Plus Corporate Actions Processing Application, System Features & Functionality," Mar. 1999, New York, NY, 32 pages.

"Xcitek Update," Summer 1996, 1 page.

"Now You Can Take Complete Control of all Corporate Actions Plus Provide Proper Notification to Your Clients," Solutionsplus, 1 page.

Krissah Williams, "Group 1 Software Posts Sharply Higher Profit; [Final Edition]," The Washington Post, Jul. 31, 2002, p. E.05.

Memorandum from Investment Company Institute dated May 2, 2003 regarding "SEC and Treasury Adopt Final Customer Identification Program Rule for Mutual Funds," 8 pages.

Memorandum from Investment Company Institute dated Aug. 12, 2003 regarding "Additional Guidance Issued on Final customer Identification Program Rule," 6 pages.

Memorandum from Investment Company Institute dated Jan. 9, 2004 regarding "Additional AML Guidance Issued on Customer Identification Program Rule," 11 pages.

Satish M. Kini, "Designing Robust Anti-Money Laundering Programs for Mutual Funds," printed from https://www.ai-aba.org/aliaba/BUSINESS/BUSWOS_Oct04.pdf, Internet site, accessed on Jan. 27, 2005, 12 pages.

ACTIMIZE—Brokerage Compliance, Anti-Money Laundering, Financial Fraud Prevention, "Solutions—AML/USPA Compliance," printed from http://www.actimize.com/asp/sub/asp?sec=116&sub=947, Internet site, accessed on Jan. 27, 2005, 4 pages.

Paul Adams, "Anti-Terrorist Rules Make It Harder to Open New Bank, Brokerage Account," printed from http://www.consumerwatchdog.org/corporate/nw/nw003637.php3, Internet site, accessed on Jan. 27, 2005, 4 pages.

Office Action dated Oct. 9, 2007 for U.S. Appl. No. 10/631,165, filed Jul. 31, 2003.

Office Action dated Jun. 26, 2008 for U.S. Appl. No. 10/631,243, filed Jul. 31, 2003.

Office Action dated Mar. 18, 2009 for U.S. Appl. No. 10/631,243, filed Jul. 31, 2003.

Office Action dated Sep. 4, 2008 for U.S. Appl. No. 11/237,501, filed Sep. 28, 2005.

Office Action dated May 28, 2009 for U.S. Appl. No. 11/237,501, filed Sep. 28, 2005.

Office Action dated Nov. 9, 2007 for U.S. Appl. No. 11/237,331, filed Sep. 28, 2005.

Office Action dated Apr. 9, 2009 for U.S. Appl. No. 12/117,387, filed May 8, 2008.

Notice of Allowance dated Jul. 1, 2009 for U.S. Appl. No. 10/631,165, filed Jul. 31, 2003.

Business Editors/High-Tech Writers, "Equant Partners with Network Applicance to Improve Enterprise Customers' Access to the Internet and Their Intranet Business Applications," *Business Wire*, New York, Jul. 31, 2003, p. 1, printed from http://proquest.umi.com/pqdweb?did=377853491&sid=1&Fmt=3&clientId=19649&RQT=309&VName=PQD, Internet site, accessed on Jun. 21, 2009, 4 pages.

Office Action dated Sep. 15, 2009 for U.S. Appl. No. 12/117,387, filed May 8, 2008.

"Asset Control Enters Into Strategic Arrangement With Fidelity Enterprise Data Systems," *PR Newswire*, Sep. 12, 2000, p. 8572, 3 pages.

Catherine Carlson, "U.S. Bank switches to Xcitek service," *Operations Management*, v. 8, n. 16, Apr. 22, 2002, p. 1, 1 page.

"Fidelity Beefs Up Action Source," *Operations Management*, Oct. 27, 1998, p. 4, 1 page.

Office Action dated Dec. 8, 2009 for U.S. Appl. No. 10/631,243, filed Jul. 31, 2003.

Notice of Allowance dated Sep. 29, 2010 for U.S. Appl. No. 10/631,243, filed Jul. 31, 2003.

Office Action dated Feb. 18, 2010 for U.S. Appl. No. 11/237,501, filed Sep. 28, 2005.

Office Action dated Aug. 11, 2010 for U.S. Appl. No. 11/237,501, filed Sep. 28, 2005.

Office Action dated Jun. 28, 2010 for U.S. Appl. No. 12/117,387, filed May 8, 2008.

* cited by examiner

SUPPLEMENTAL APPLICATION FROM for
FOREIGN BUSINESS ORGANIZATIONS or ENTITIES

IMPORTANT INFORMATION ABOUT THIS FORM AND HOLDING AN ACCOUNT. U.S. law requires that U.S. financial institutions identify accounts being opened by certain foreign financial institutions and obtain certain baseline information from that account about its type, purpose and anticipated activity to help the U.S. government fight the funding of terrorism and to prevent money laundering activiities. You must complete this due diligence information request (including any future requests to supplement information) to assist the requesting U.S. financial institution with its compliance obligations under U.S. laws and regulations. Failure to timely provide the information requested, or the provision of incomplete or incorrect information on this form, may result in restrictions being applied to your account or the filing of a suspicious activity report. Complete all of the following questions. If a question is not applicable to your business organization or entity, reply by indicating "not applicable" in the response area provided.

― 302

I. NAME AND ADDRESS

1. Provide the full name of business organization or entity holding this account ("company"). Include any business trade names used by the company.

2. Provide the headquarters address (must be a street address) of the company.

3. Provide the year of formation of the company.

4. Provide the full name, title, address and phone number of the company official completing this form.

5. Provide the full name of any person, parent organization or entity of the company that directly or indirectly holds a majority interest in the company ("majority owner").

6. Provide the business address (must be a street address) of any majority owner of the company.

― 304

II. CHARTER OR REGISTRATION

1. In what jurisdiction is the company primarily registered and chartered.

a. Provide the primary registration and charter number:

2. In what jurisdiction is each majority owner of the company registered or chartered:

a. Provide the primary registration and charter number:

FIG. 3A

3. Is your company or any of its offices located in a country or territory that is the subject of U.S. economic sanctions imposed by the U.S. Department of the Treasury's Office of Foreign Assets Control? [Go to (http://www.treas.gov/offices/enforcement/ofac) for up to date information on such sanctions.]
Yes ☐ or No ☐
If yes, please provide name of country or territory _____

4. Is your company or any of its offices located in a country or territory that is the subject of U.S. proposed or imposed special measures under section 311 administered by the U.S. Department of the Treasury? [Go to (http://www.fincen.gov/reg_bsaregulations.html) for up to date information on section 311.]
Yes ☐ or No ☐
If yes, please provide name of country or territory _____

5. Is your company or any of its offices located in a country or territory that is currently listed as one that is non-cooperative in implementing international anti-money laundering standards as determined by the Financial Action Task Force? [Go to (http://www.fatf-gafi.org) for up to date information from the Financial Action Task Force.]
Yes ☐ or No ☐
If yes, please provide name of country or territory _____

6. Is your company:
☐ Government owned
☐ Privately owned
☐ Publicly traded (List Exchange): _____

7. Please provide business classification by answering the questions below to the best of your ability. ⎯⎯ 304 a. The company is a:
☐ Bank organized and located outside of the United States
☐ Foreign office, agent or branch of a U.S. covered financial institution
[A "covered financial institution" is generally any of the following: a bank; a credit union; a savings association; a corporation acting under section 25A of the Federal Reserve Act; a trust bank or company; a securities broker-dealer; a futures commission merchant; an introducing broker; or a mutual fund.
☐ Money transmitter
☐ Currency dealer or exchanger
☐ None of the above b. If the company was located or operating in the United States, would it be required to register as a:
☐ Mutual fund
☐ Securities broker-dealer
☐ Futures commission merchant
☐ None of the above c. If "None of the above" was selected as the answers to both 7a. and 7b., please provide the business classification that best suites the company:

---

Note: An entity that answers "Not applicable" to both 7.a. and 7.b. need only complete section VII of the remaining sections of this document.

FIG. 3B

III. NATURE OF BUSINESS

1. What is the general nature of the business engaged in by company? (Please check all that apply.)

Depository banking ☐
Investment banking ☐
Broker/Dealer ☐
Hedge Fund ☐ ⟵ 306
Mutual Fund ☐
Currency Dealer ☐
Pension Fund ☐
Commodities merchant ☐
*Other, Please briefly describe below: ☐

_____

2. List the ten jurisdictions in which you have the greatest sales volume (accounts):

_____

_____

IV. PURPOSE OF ACCOUNT ⟵ 308

1. Will this be a proprietary operating account for the company?
Yes ☐ or No ☐

2. Will customers be allowed to direct investment in this account?
Yes ☐ or No ☐
If yes, please indicate customer types below:
☐ Money service business
☐ Trade union
☐ Government or government official
☐ Trade union
☐ Export or import company
☐ Jewelry or gem merchant
☐ Dealer in precious metals
☐ Travel agency 3. Will the company allow banks organized and located outside of the United States to utilize or otherwise to direct investments in this account?
Yes ☐ or No ☐ a. If your reply is yes, for each bank please provide a separate page listing responses to all of the questions found in subsections I, II and VI of this Supplemental Application Form, provide contact information of customer bank official for purposes of subsection I.3.

V. ANTI-MONEY LAUNDERING RECORD ⟵ 310

1. Is your company subject to anti-money laundering laws or anti-money laundering regulatory or enforcement body?

FIG. 3C

Yes ☐ or No ☐

2. Please provide the name and address of your company's anti-money laundering regulator. ⟋310

___

3. Has the company ever been cited or fined for aiding, abetting or participating in a money laundering crime?
Yes ☐ or No ☐
If yes, please provide a brief explanation of the nature of the violation/s with date/s and amount of fine/s.

___

___

4. Has the company ever been cited or fined for an anti-money laundering program violation?
Yes ☐ or No ☐
If yes, please provide a brief explanation of the nature of the violation/s with date/s and amount of fine/s.

___

___

VI. ANTICIPATED ACCOUNT ACTIVITY ⟋312

1. What level of activity is expected to be conducted through the account?
a. Anticipated volume of trading per calendar quarter in U.S. dollars (after initial investment):

Zero to 100,000 ☐
101,000 to 500,000 ☐
500,000 to 1,000,000 ☐
Greater than 1,000,000 ☐ b. Anticipated volume of redemption transactions per calendar quarter:

Zero to 2 ☐
3 to 5 ☐
6 to 10 ☐
Greater than 10 ☐
Daily trading ☐ c. Anticipated subsequent purchases will primarily be funded by:
Wire transfer ☐
ACH ☐
Corporate draft ☐
Other (please specify): ___ d. Anticipated redemption proceeds will be primarily paid to:
Primary account owner ☐
Alternate payee is same jurisdiction as Company* ☐
Alternate payee in different jurisdiction than Company* ☐
Check writing privileges ☐

FIG. 3D

\*Please briefly describe the affiliation of alternate payees to the entity: — 312

VII. <u>SIGNATURE OF COMPANY OFFICIAL COMPLETING FORM</u> — 314

Please print name and title:

Please sign name and date:

<u>FIG. 3E</u>

Risk Ranking: \_\_\_ Highest  Analyst Name & Initials: _____  402

\_\_\_ High  Date: _____/_____/_____

\_\_\_ Standard  Independent Reviewer Name & Initials: _____

Date: _____/_____/_____

Management Company/Fund: _____

Account Number: _____

Account Name: _____

Risk Ranking for Foreign Correspondent Accounts

The information needed to complete this form will be obtained from the Supplemental Application Form for Foreign Business Organizations or Entities ("Supplemental Form"). PFPC Corporate Compliance procedures regarding foreign correspondent accounts require that this risk-ranking document be completed for each verified foreign correspondent account.

I. Assessment of Rule Applicability

Before you begin to complete this form, refer to Section II, Question 7 on the Supplemental Form. If the Company answered Questions 7.a and 7.b with "none of the above", it is not necessary to complete this risk ranking form.

Are either of the responses to Supplemental Form Section II, Questions 7.a or Question 7.b "none of the above"?

Check One: \_\_\_ Yes (Stop)  \_\_\_ No (Complete the rest of the form)

II. Highest Risk Category

If "yes" is the answer to any one or more of the questions in this section:

1. The foreign correspondent bank account will be assigned to the "highest-risk" category (question 7a).
2. An AML Case should be created and delivered to both PFPC's Corporate Compliance and PFPC's Client.
3. Operations should be instructed to place a full stop on the account until further instructed by PFPC Corporate Compliance.

Company Name Search (look up on World-Check): ——— 406

| | | YES | NO |
|---|---|---|---|
| Is the Company a confirmed match on the Office of Foreign Assets Control's Specially Designated National List ("SDN List")? | Supplemental Form Section I, Question 1 | YES | NO |
| Is the Company currently designated as a primary money laundering concern (proposed or final rule) by the U.S. Department of the Treasury ("Treasury")? | Supplemental Form Section I, Question 4 | YES | NO |

Company Official Name Search (lookup on World-Check): — 408

| Is the Company official a confirmed match on the SDN List? | Supplemental Form Section I, Question 5 | YES | NO |
|---|---|---|---|
| | | | |

Majority Owner Name Search (look up on World-Check): — 410

| Is the majority owner of the Company a confirmed match on the SDN List? | Supplemental Form Section I, Question 5 | YES | NO |
|---|---|---|---|
| | | | |
| Is the majority owner of the Company currently designated as a primary money laundering concern (proposed or final rule) by Treasury? | Supplemental Form Section I, Question 5 | YES | NO |

Company Location and Organization (Compare against "OFAC Country List" and "Section 311 Country List"): — 412

| Is the Company located in a territory or country that is currently targeted with economic sanctions by the Office of Foreign Assets Control ("OFAC")? | Supplemental Form Section I, Question 2 Section II, Question 3 | YES | NO |
|---|---|---|---|
| Is the Company located in a territory or country that is currently designated as a jurisdiction of primary money laundering concern (proposed or final rule) by Treasury" | Supplemental Form Section I, Question 2 Section II, Question 4 | YES | NO |
| Is the Company chartered/registered in a territory or country that is currently targeted with economic sanctions by the OFAC? | Supplemental Form Section II, Question 1 | YES | NO |
| Is the Company chartered/registered in a territory or country that is currently designated as a jurisdiction of primary money laundering concern (proposed or final rule) by Treasury? | Supplemental Form Section II, Question 1 | YES | NO |

Majority Owner Location and Organization (Compare against "OFAC Country List" and "Section 311 Country List"): — 414

| Is the majority owner of the Company located in a territory or country that is currently targeted with economic sanctions by the OFAC? | Supplemental Form Section I, Question 6 Section II, Question 3 | YES | NO |
|---|---|---|---|
| Is the majority owner of the Company located in a territory or country that is currently designated as a jurisdiction of primary money laundering concern (proposed or final rule) by Treasury? | Supplemental Form Section I, Question 6 Section II, Question 4 | YES | NO |
| Is the majority owner of the Company chartered/registered in a territory or country that is currently targeted with economic sanctions by OFAC? | Supplemental Form Section II, Question 2 | YES | NO |
| Is the majority owner of the Company chartered/registered in a territory or country that is currently designated as a jurisdiction of primary money laundering concern (proposed or final rule) by Treasury? | Supplemental Form Section II, Question 2 | YES | NO |

FIG. 4B

Company Jurisdictional Business Pursuits (Compare against "OFAC Country List" and "Section 311 Country List"):     — 416

| Did the Company indicate that they are doing business in a country or territory that is currently targeted with economic sanctions by OFAC? | Supplemental Form Section III, Question 2 | YES | NO |
|---|---|---|---|
| Did the Company indicate that they are doing business in a country or territory that is currently designated as a jurisdiction of primary money laundering concern (proposed of final rule) by Treasury? | Supplemental Form Section III, Question 2 | YES | NO |

Please Review Section II Responses.   — 418

Were any of the responses answered yes?   Check One:   ___ YES   ___ NO

If yes, note on page 1 that the item has been ranked with a "Highest Risk" Rating and Stop.

If "no" is the answer to all of the questions in Section II, continue to Section III below.

III. High Risk Matrix

If "yes" is the answer to any one or more of the questions in Part A. of this section:

1.     The account will be placed in the "high risk" category.
    2.     Note on page 1 a "High Risk" Rating and Stop.

Part A.

Company Location and Organization (Compare against "FATF List"):   — 420

| Is the Company located in a territory or country that is currently on the Financial Action Task Force's list of non-cooperative countries ("FATF List")? | Supplemental Form Section I, Question 2 | YES | NO |
|---|---|---|---|
| Is the Company chartered/registered in a territory or country that is currently found on the FATF List? | Supplemental Form Section I, Question 2 | YES | NO |

Company's Anti-Money Laundering Record (Compare against World-Check results):   — 422

| Did the Company indicate that they have ever been fined for an anti-money laundering crime? | Supplemental Form Section V, Question 3 | YES | NO |
|---|---|---|---|
| Did World-Check report that the Company has been fined for an anti-money laundering crime within the last 5 years, other than indicated by the Company? If yes, create an AML referral. | | YES | NO |
| Did the Company indicate that they have ever been fined for an anti-money laundering program failure? | Supplemental Form Section V, Question 4 | YES | NO |
| Did World-Check report that the Company has ever been fined for an anti-money laundering program failure within the last 5 years, other than indicated by the Company? If yes, create an AML referral. | | YES | NO |

FIG. 4C

Purpose of Account: ———— 424

| Did the Company indicate that they would allow customers to direct investment in this account? | Supplemental Form Section IV, Question 2 | YES | NO |
|---|---|---|---|
| Did the Company indicate that any of the customers directing investment in the account are any of the following businesses types provided in Supplemental Application Form, section IV, question 2? | Supplemental Form Section IV, Question 2 | YES | NO |
| Did the Company indicate that they will allow other banks to "nest" within their account? | Supplemental Form Section IV, Question 3 | YES | NO |

Please Review Section III, Part A. Responses.     426

Were any of the responses answered yes?    Check One:      ___ YES      ___ NO

If yes, note on page 1 that the item has been ranked with a "High Risk" Rating and Stop.
*     Also create an AML referral if World-Check reported that the Company has ever been fined for an anti-money laundering crime, or program failure, other than indicated by the Company.

If "no" is the answer to all of the questions in Part A, continue and answer all of the questions of Part B. of this section.

Part B.

The score compiled as a result of the answers in this Part will determine whether the account is "high risk" or "standard risk."

428

Company Location and Organization (Compare against "PNC High Risk Country List"):

| Is the Company located in a territory or country that is currently on PNC's High Risk Country List? | Supplemental Form Section I, Question 2 | YES | NO |
|---|---|---|---|
| Is the Company chartered/registered in a territory or country that is currently found on PNC's High Risk List? | Supplemental Form Section I, Question 2 | YES | NO |

430

Majority Owner Location and Organization (Compare against "PNC High Risk Country List"):

| Is the Majority Owner located in a territory or country that is currently on PNC's High Risk List? | Supplemental Form Section I, Question 6 | YES | NO |
|---|---|---|---|
| Is the Majority Owner chartered/registered in a territory or country that is currently found on PNC's High Risk List? | Supplemental Form Section I, Question 6 | YES | NO |

432

Company's Anti-Money Laundering Record:

| Did the Company indicate that they are not subject to anti-money laundering laws or an anti-money laundering regulatory or enforcement body? | Supplemental Form Section V, Question 1 | YES | NO |
|---|---|---|---|

FIG. 4D

Company Ownership and Formation: _____434

| Has the Company been formed within the last five years? | Supplemental Form Section I, Question 3 | YES | NO |
|---|---|---|---|
| Did the Company indicate that they are privately held or government owned? | Supplemental Form Section II, Question 6 | YES | NO |

Anticipated Activity Associated with Account: _____436

| Did the Company indicate that they anticipate trading volumes greater than 500,000 U.S. dollars per quarter? | Supplemental Form Section VI, Question 1.a. | YES | NO |
|---|---|---|---|
| Did the Company indicate that they anticipate redemption transaction of greater than 5 per calendar quarter? | Supplemental Form Section VI, Question 1.b. | YES | NO |
| Did the Company indicate that they anticipate redemption proceeds primarily being paid to alternate payees in a different jurisdiction than Company or will Company be making use of check writing privileges? | Supplemental Form Section VI, Question 1.c. | YES | NO |

Please Calculate Section III, Part B. Responses.  Total = 10  ___ YES  ___ NO  _____438
Every answer in this Part B. counts as one point (only Section III, Part B. answers should be calculated).

Check One:
___ 5 or More "Yes" answers: High        ___ Less than 5 "Yes" answers: Standard Note this Risk Ranking on page 1, above

FIG. 4E

✓ SAVE DOC & EXIT

SUBMITTED: 05/24/2007    BY: DOUGLAS J. CRAIG/PFPC/DEL/PNC    FCDD #: E50062788B

○ CORRO    ○ INDEPENDENT REVIEW    ⊙ NEW    ○ PENDING UPDATE
○ DUE DILIGENCE    ○ NEED INFO    ○ NOT APPLICABLE

OPENED DATE: [16]    CLOSED DATE: [16]    DUE DILIGENCE REVIEW DATE: [16]

FCDD REPORT DATE: [16]    COMPLETED QUESTIONNAIRE RECEIVED [16]

▶ REGISTRATION

502

SOCIAL CODE: [ ]
ACCOUNT: [ ]                                    MANAGEMENT COMPANY: [ ▶]
SYSTEM: [ ▶]                                    CIP SUBMISSION STATUS: [ ]
OPEN/CLOSED INDICATOR: [ ]                      SELECTION CODE: [ ]    SELECTION CODE: [ ]
                                                NEW/MAINTENANCE CODE: [ ]
                                                FOREIGN FINANCIAL INDICATOR: [ ]

FOREIGN ACCOUNT
LINE 1:
LINE 2:
LINE 3:
LINE 4:
LINE 5:
LINE 6:
COUNTRY: ▶
COUNTRY CODE #:
TIN OR SSN:
BROKER NAME/ADDRESS:

506

ADDITIONAL ADDRESS INFORMATION
BENEFICIARY NAME:
TIN OR SSN:
STREET ADDRESS 1:
STREET ADDRESS 2:
STREET ADDRESS 3:
COUNTRY: ▶
COUNTRY CODE #:

508

▶ INITIAL SEARCH & MAILING

SEARCHES
SEARCHES PERFORMED:
- ☐ CIP
- ☐ GLM
- ☐ CHOICEPOINT
- ☐ IMPRESS
- ☐ AML DB
- ☐ OFAC WEBSITE
- ☐ EDGAR
- ☐ WORLD-CHECK WEB TOOL
- ☐ LEXIS-NEXUS
- ☐ POLK'S
- ☐ FCDD DB
- ☐ RECORDKEEPING SYSTEM
- ☐ COUNTRY SUFFIX LIST
- ☐ DUN & BRADSTREET
- ☐ OTHER

SEARCH RESULTS: ⌐ ⌐
REASON CODES: ○ REASON CODE 1   ○ REASON CODE 2   ○ REASON CODE 3
ATTACHMENTS: ⌐ ⌐

[SIGNOFF SEARCHES]

SEARCHES SIGNED OFF BY: ⌐ ⌐ AT: ⌐ ⌐

SEND TO CORRO – SIGNED OFF BY: ⌐ ⌐ AT: ⌐ ⌐

MAILINGS

INITIAL MAILING: [16]
CORRO REF #: ⌐ ⌐
BACK END MRN #: ⌐

[SIGNOFF INITIAL MAILING]

SIGNED OFF BY: ⌐ ⌐ AT: ⌐ ⌐

BEFORE SECOND MAILING PERFORM RESEARCH WITH CSO AND OPERATIONS TO FIND OUT IF QUESTIONNAIRE HAS ARRIVED YET.

SECOND MAILING: [16]
DATE REVIEWED: [16]
CORRO REF #: ⌐ ⌐
MRN #: ⌐ ⌐

[SIGNOFF SECOND MAILING]

SIGNED OFF BY: ⌐ ⌐ AT: ⌐ ⌐

*FIG.5B2*

▼ QUESTIONNAIRE PROGRESS / RESULTS

SELECT THE APPROPRIATE BUTTON

⦿ IF QUESTIONNAIRE IS RECEIVED PRIOR TO 105 DAYS OF THE INITIAL MAILING DATE AND IS RISK RANKED AS EITHER "STANDARD", "HIGH" OR "HIGHEST" AND

○ IF QUESTIONNAIRE IS NOT RECEIVED PRIOR TO 105 DAYS OF THE INITIAL MAILING DATE AND/OR THE QUESTIONNAIRE IS RETURNED AS INCOMPLETE AFTER THE

— 514

RISK INDICATOR

RISK INDICATOR:   ○ HIGHEST
                  ○ HIGH
                  ○ STANDARD
                  ○ NOT APPLICABLE

— 516

DATE RISK CODE REQUESTED

DATE RISK CODE WAS REQUESTED VIA IMAGE: [16]

VERIFIED THAT RISK CODE WAS PLACED: [16]

RISK INDICATOR MRN: [ ]

FIG.5C1

SEARCHES PERFORMED

SEARCHES PERFORMED:
- ☐ CIP
- ☐ GLM
- ☐ CHOICEPOINT
- ☐ IMPRESS
- ☐ AML DB
- ☐ OFAC WEBSITE
- ☐ EDGAR
- ☐ WORLD-CHECK WEB TOOL
- ☐ LEXIS-NEXUS
- ☐ POLK'S
- ☐ FCDD DB
- ☐ RECORDKEEPING SYSTEM
- ☐ COUNTRY SUFFIX LIST
- ☐ DUN & BRADSTREET
- ☐ OTHER

SEARCH RESULTS: ⌐ ⌐
ATTACHMENTS: ⌐ ⌐

CORRO SIGNOFF

[POST CORRO SIGNOFF]

SIGNED OFF BY: ⌐ ⌐  AT: ⌐ ⌐      [16]

▶ TRANSCRIPTS

TRANSCRIPT REVIEW DATE:      TRANSCRIPT ACTION:   ○ CHANGE FREQUENCY   ○ STAY SAME
RESULTS OF TRANSCRIPT REVIEWER:
⌐ ⌐

▶ ANNUAL MAILING

ANNUAL MAILING MONTH: ⌐ ⌐ ▶
ANNUAL MAILING COMMENTS:
⌐ ⌐

▶ COMMENTS

ENTER ANY PROGRESS, RESOLUTION, UPDATES OR COMMENTS IN THIS BOX:
⌐ ⌐

PFP

FOREIGN
CORRESPONDENT
DUE DILIGENCE

CREATE NEW SUSPECT FORM
▶ VIEWS
  OPEN ITEMS
  BY STATUS
  PENDING UPDATE
  DUE DILIGENCE
  NOT APPLICABLE
  MANAGEMENT COMPAN

EXIT

LEGEND:
● = 60 DAYS FROM INITIAL MAILING
◆ = 45 DAYS FROM SECOND MAILING

🔍 SEARCH IN VIEW 'BY STATUS VIEW'     ○ INDEXED    [?] [X]

SEARCH FOR [          ]   [ SEARCH ]   ▲ MORE

| STATUS | FCDD DATE | REP | INITIAL MAILING | SECOND MAILING | RISK RATING | QUESTIONNAIRE RECEIVED | MANAGEMENT |
|---|---|---|---|---|---|---|---|
| ▲ CORRO | | | | | | | |
| ▲ DUE DILIGENCE | | | | | | | |
| ▲ INDEPENDENT REVIEW | | | | | | | |
| ▲ NEED INFO | | | | | | | |
| ▼ NEW | 05/24/2007 | DOUGLAS J CRAIG | | | | | 0700EP PLAN INV |
| ▲ NOT APPLICABLE | | | | | | | |
| ▲ PENDING UPDATE | | | | | | | |

*FIG. 6*

PFP

FOREIGN CORRESPONDENT DUE DILIGENCE

CREATE NEW SUSPECT FORM
▶ VIEWS
  OPEN ITEMS
  BY STATUS
  PENDING UPDATE
  DUE DILIGENCE
  NOT APPLICABLE
  MANAGEMENT COMPAN

EXIT

LEGEND:
● = 60 DAYS FROM INITAL MAILING
◆ = 45 DAYS FROM SECOND MAILING

🔍 SEARCH IN VIEW 'BY STATUS VIEW'     ○ INDEXED

SEARCH FOR [          ]  [ SEARCH ]   ▲ MORE

| SI | FCDD DATE | REP | INITIAL MAILING | SECOND MAILING | RISK RATING | QUESTIONAIRE RECEIVED | MANAGEMENT |
|----|-----------|-----|-----------------|----------------|-------------|----------------------|------------|
| ▲ CORRO | | | | | | | |
| ▲ DUE DILIGENCE | | | | | | | |
| ▲ INDEPENDENT REVIEW | | | | | | | |
| ▲ NEED INFO | | | | | | | |
| ▼ NOT APPLICABLE | | | | | | | |
| | 07/01/2006 | DOUGLAS J CRAIG | | | | | ADI |
| | 07/10/2006 | DOUGLAS J CRAIG | | | | | ADI |
| | 09/14/2006 | DALILA T CARTER | | | | | ADI |
| | 09/15/2006 | DALILA T CARTER | | | | | ADI |
| | 09/28/2006 | DALILA T CARTER | | | | | ADI |
| | 09/28/2006 | DALILA T CARTER | | | | | ADI |
| | 10/03/2006 | JENNIFER D AUGUSTUS | | | | | ADI |
| | 10/06/2006 | DALILA T CARTER | | | | | ADI |
| | 10/10/2006 | DALILA T CARTER | | | | | ADI |
| | 10/10/2006 | DALILA T CARTER | | | | | ADI |
| | 10/10/2006 | DALILA T CARTER | | | | | ADI |
| | 10/19/2006 | DALILA T CARTER | | | | | ADI |
| | 10/20/2006 | DALILA T CARTER | | | | | ADI |
| | 11/08/2006 | DALILA T CARTER | | | | | ADI |

FIG. 7

PFP

FOREIGN CORRESPONDENT DUE DILIGENCE

CREATE NEW SUSPECT FORM
▶ VIEWS
   OPEN ITEMS
   BY STATUS
   PENDING UPDATE
   DUE DILIGENCE
   NOT APPLICABLE
   MANAGEMENT COMPAN

EXIT

LEGEND:
● = 60 DAYS FROM INITAL MAILING
◆ = 45 DAYS FROM SECOND MAILING

🔍 SEARCH IN VIEW 'BY STATUS VIEW'    ○ INDEXED

SEARCH FOR [        ]   [ SEARCH ]   ▲ MORE

| STATUS | FCDD DATE | REP | INITIAL MAILING | SECOND MAILING | RISK RATING | QUESTIONAIRE RECEIVED | MANAGEMENT C |
|---|---|---|---|---|---|---|---|
| ▼ CORRO | | | | | | | |
| | 02/01/2007 | DALILA T CARTER | 02/16/2007 | 04/17/2007 | | | 00180 |
| | 05/12/2007 | DALILA T CARTER | | | | | 00180 |
| | 12/26/2006 | DALILA T CARTER | 02/16/2007 | 04/17/2007 | | | A25 |
| | 02/08/2007 | DALILA T CARTER | 02/16/2007 | 04/17/2007 | | | BLK |
| | 03/03/2007 | DALILA T CARTER | 03/13/2007 | 05/17/2007 | | | BLK |
| | 03/31/2007 | DALILA T CARTER | 04/17/2007 | | | | BLK |
| | 04/19/2007 | DALILA T CARTER | 04/27/2007 | | | | BLK |
| | 03/29/2007 | DALILA T CARTER | 04/02/2007 | | | | DRH |
| | 03/31/2007 | DALILA T CARTER | 04/17/2007 | | | | DRH |
| | 01/30/2007 | DALILA T CARTER | 02/16/2007 | 04/17/2007 | | | PIM |
| ▲ DUE DILIGENCE | | | | | | | |
| ▲ INDEPENDENT REVIEW | | | | | | | |
| ▲ NEED INFO | | | | | | | |
| ▲ NOT APPLICABLE | | | | | | | |
| ▲ PENDING UPDATE | | | | | | | |

⊙ PFP

FOREIGN CORRESPONDENT DUE DILIGENCE

CREATE NEW SUSPECT FORM

▶ VIEWS
   OPEN ITEMS
   BY STATUS
     PENDING UPDATE
     DUE DILIGENCE
     NOT APPLICABLE
     MANAGEMENT COMPAN

EXIT

LEGEND:
● = 60 DAYS FROM INITAL MAILING
◆ = 45 DAYS FROM SECOND MAILING

🔍 SEARCH IN VIEW 'BY STATUS VIEW'     ○ INDEXED   [?][X]

SEARCH FOR [     ] [SEARCH]  ▲ MORE

| | STATUS | FCDD DATE | REP | INITIAL MAILING | SECOND MAILING | RISK RATING | QUESTIONAIRE RECEIVED | MANAGEMENT |
|---|---|---|---|---|---|---|---|---|
| | ▲ CORRO | | | | | | | |
| | ▲ DUE DILIGENCE | | | | | | | |
| | ▲ INDEPENDENT REVIEW | | | | | | | |
| | ▲ NEED INFO | | | | | | | |
| | ▲ NOT APPLICABLE | | | | | | | |
| | ▼ PENDING UPDATE | | | | | | | |
| ◆ | | 07/28/2006 | DALILA T CARTER | 08/31/2006 | 11/10/2006 | HIGH | | PFS PRIMERIC |
| ◆ | | 07/28/2006 | DALILA T CARTER | 08/31/2006 | 11/03/2006 | HIGH | | PFS PRIMERIC |
| ◆ | | 07/28/2006 | DALILA T CARTER | 09/12/2006 | 11/16/2006 | HIGH | | PFS PRIMERIC |
| ◆ | | 07/28/2006 | DALILA T CARTER | 09/12/2006 | 11/16/2006 | HIGH | | PFS PRIMERIC |

PFP

FOREIGN CORRESPONDENT DUE DILIGENCE

CREATE NEW SUSPECT FORM
▼ VIEWS
  OPEN ITEMS
  BY STATUS
  PENDING UPDATE
  DUE DILIGENCE
  NOT APPLICABLE
  MANAGEMENT COMPAN

EXIT

LEGEND:
● = 60 DAYS FROM INITAL MAILING
◆ = 45 DAYS FROM SECOND MAILING

🔍 SEARCH IN VIEW 'BY STATUS VIEW'     ○ INDEXED     [?] [X]

SEARCH FOR [          ]  [ SEARCH ]

▲ MORE

| STATUS | FCDD DATE | REP | INITIAL MAILING | SECOND MAILING | RISK RATING | QUESTIONNAIRE RECEIVED | MANAGEMENT |
|---|---|---|---|---|---|---|---|
| ▲ CORRO | | | | | | | |
| ▲ DUE DILIGENCE | | | | | | | |
| ▲ INDEPENDENT REVIEW | | | | | | | |
| ▼ NEED INFO | | | | | | | |
| | 05/10/2007 | DALILA T CARTER | | | | | 00180 |
| ▲ NOT APPLICABLE | | | | | | | |
| ▲ PENDING UPDATE | | | | | | | |

*FIG. 11*

PROMOTING COMPLIANCE BY FINANCIAL INSTITUTIONS WITH DUE DILIGENCE REQUIREMENTS

CROSS-REFERENCE TO RELATED APPLICATION/PRIORITY CLAIM

The present application claims priority to U.S. provisional patent application Ser. No. 60/937,901, filed on Jun. 29, 2007, the entirety of which is incorporated by reference.

FIELD OF THE INVENTION

Embodiments of the invention generally relate to collecting, analyzing, storing and processing data and information in connection with compliance with regulatory and/or statutory legal requirements. In certain embodiments, the invention more particularly relates to processes for promoting compliance with due diligence requirements imposed on accounts of certain foreign financial institutions.

BACKGROUND

Many financial institutions such as mutual funds, for example, are subject to a variety of requirements arising from procedural and operational aspects of conducting business. These requirements may arise from rules, regulations or laws at the local, state, or federal level, and it is typically necessary for financial institutions to evaluate and promote compliance with such requirements.

For example, Section 312 of the USA Patriot Act requires United States financial institutions to establish and implement compliance programs that address money laundering risks perceived by the United States Department of the Treasury with respect to "foreign correspondent accounts" established or maintained by foreign financial institutions. Section 312 requires financial institutions to incorporate due diligence programs into their anti-money laundering programs which are reasonably designed to identify accounts opened or maintained for a foreign financial institution and to monitor such accounts to detect and report known or suspected money laundering activity. Among other entities, the Treasury Department defines foreign financial institutions to include: foreign banks, foreign mutual funds and foreign offices of United States covered institutions; non-U.S. entities that if located in the United States would be required to register as securities broker/dealers; futures commission merchants or mutual funds; and readily identifiable foreign currency dealers and foreign money transmitters.

What are needed are more effective and efficient tools, techniques and processes for collecting, analyzing and managing data needed by financial institutions to promote compliance with federal laws and regulations, such as the USA Patriot Act.

BRIEF DESCRIPTION OF THE FIGURES

The utility of the embodiments of the invention will be readily appreciated and understood from consideration of the following description of the embodiments of the invention when viewed in connection with the accompanying drawings, wherein:

FIGS. 3A through 3E include a sample of a supplemental application that may be used in association with certain embodiments of the invention;

FIGS. 4A through 4E include a sample of a risk ranking tool that may be used in association with certain embodiments of the invention; and, FIGS. 5A1 through 12 include samples of screen displays that may be provided as user interfaces for a system configured in accordance with embodiments of the invention.

DESCRIPTION

Figure 1:
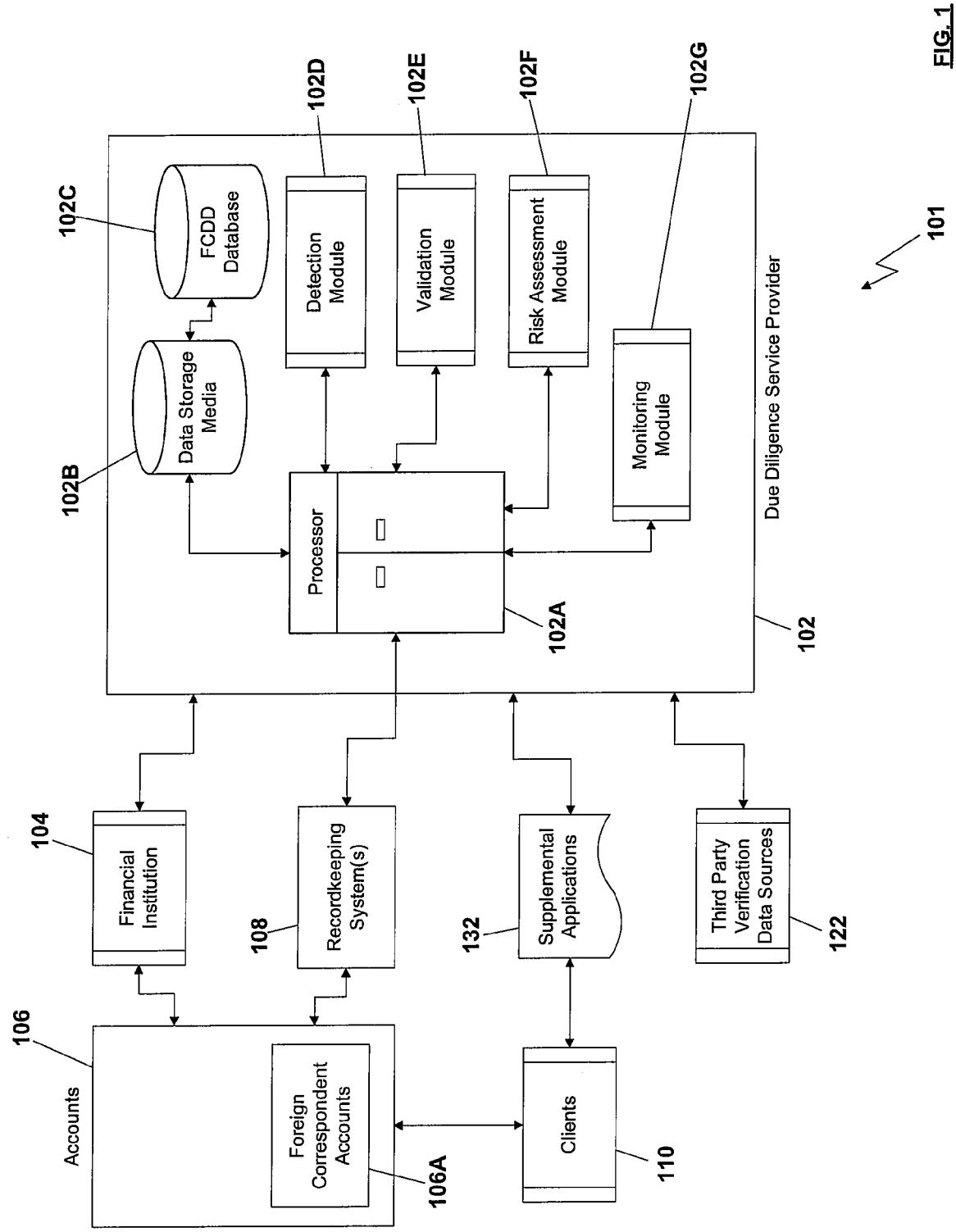
FIG. 1 includes a schematic illustrating an example of a system architecture structured in accordance with various embodiments of the invention.

Embodiments of the invention may be employed to effectively assess the requirements of and promote compliance with certain legal and regulatory requirements, such as due diligence requirements imposed on covered financial institutions under the USA Patriot Act ("Patriot Act"), such as requirements under Section 312 of the Patriot Act, for example. As described below, certain embodiments of the invention may be used to detect, validate, perform risk assessments and conduct ongoing monitoring activities with regard to accounts established or maintained for foreign financial institutions.

In various embodiments, the invention may be specifically adapted for use by independent transfer agent service providers, internal or external compliance programs of financial institutions, compliance consultants, or other entities in providing anti-money laundering services. Embodiments of the invention may be employed to implement processes by which certain foreign financial institution accounts in mutual funds are identified, risk ranked, and monitored. In operation, the invention may incorporate one or more of transfer agent recordkeeping and related systems, case management tools, supplementary applications and standardized risk ranking score sheets, and methods for the timing, frequency, execution of monitoring procedures, and reporting and storage of due diligence, risk ranking and monitoring information and results. For example, each account belonging to a foreign financial institution identified by the mutual fund may be required to undergo a risk assessment/rating process. This process may consider the jurisdiction where the foreign financial institution is located, the jurisdiction in which it is principally supervised by a regulatory authority, the anti-money laundering record of the institution, and/or the stated purpose or anticipated activity of the institution in connection with the account. For example, enhanced due diligence requirements may be needed when an institution establishes or maintains a correspondent account for a foreign bank that operates under an offshore banking license; under a license issued by a foreign country that has been designated as non-cooperative with international anti-money laundering standards; and/or, under a license issued by a country that has been designated by the Treasury Department as a primary money laundering concern warranting such special measures.

Embodiments of the invention may facilitate identifying accounts for which certain risk management procedures should be performed. Such enhanced due diligence procedures may include obtaining a copy of a foreign financial institution's anti-money laundering program and making a determination as to whether that program is reasonably designed to achieve its goal. A covered financial institution, for example, may be required to determine if its foreign financial institution's accounts allow other foreign financial institutions to "nest" in their accounts and to obtain certain information about those "nested" accounts. In addition, for any foreign financial institution which is not publicly traded, the enhanced due diligence process may require that each owner be identified along with the extent and nature of their ownership interest. The process may further require monitoring of foreign financial institution accounts for money laundering and other suspicious activities.

As applied herein, the term "financial institution" may include a "foreign financial institution" as defined in accordance with the Patriot Act such as, for example and without limitation, foreign banks; foreign mutual funds; foreign offices of United States covered financial institutions; non-U.S. entities that if located in the United States would be required to register as securities broker/dealers; futures commission merchants or mutual funds; and, readily identifiable foreign currency dealers and foreign money transmitters. In certain embodiments, the term "financial institution" may also more broadly encompass any firm, company, organization or institution capable of using or accessing the detection, validation, risk assessment, monitoring, reporting aspects, and/or other aspects of the invention described herein.

Figure 2:
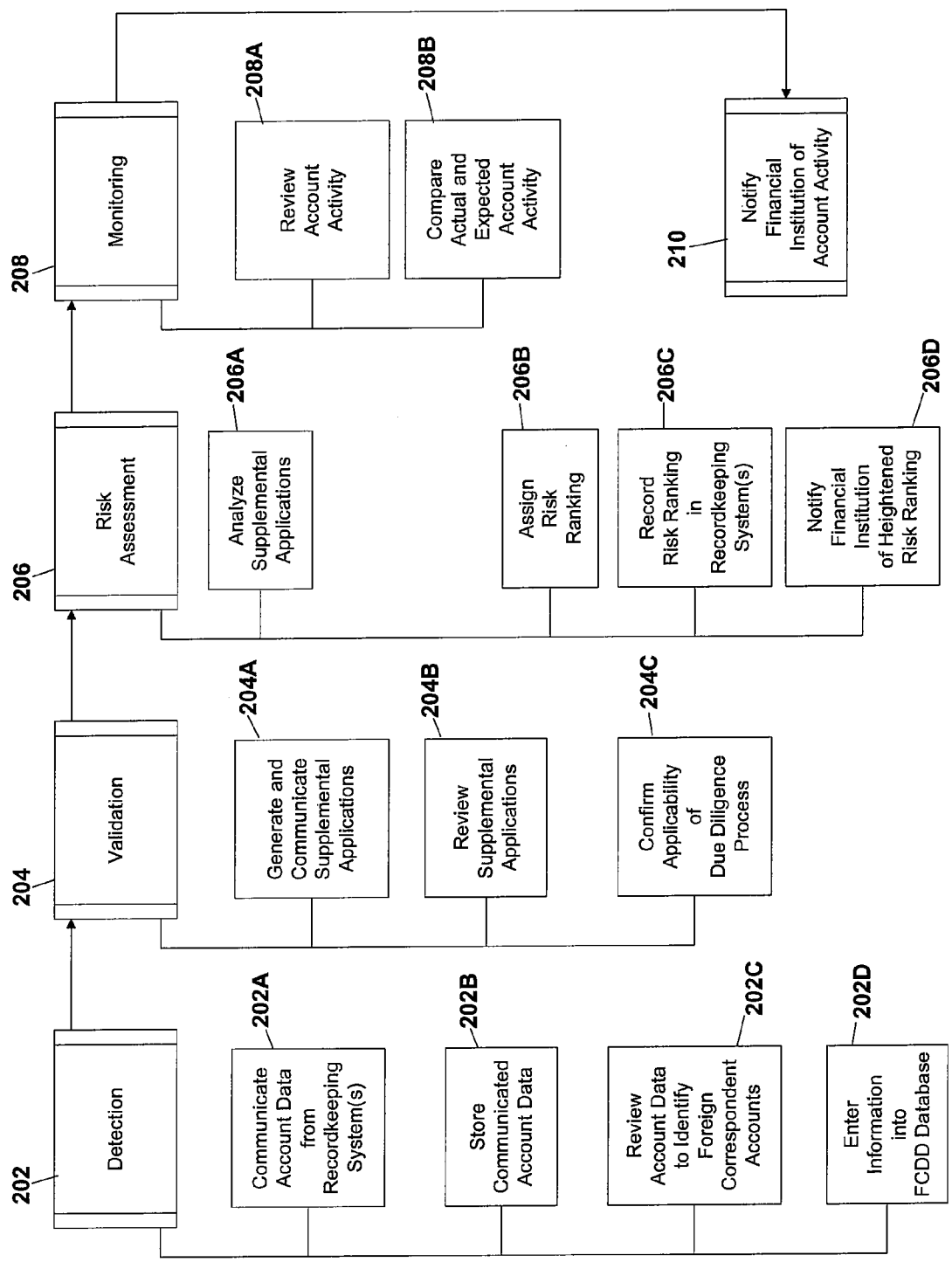
FIG. 2 includes a process flow diagram illustrating various examples of process aspects of embodiments of the invention.

With reference to FIGS. 1 and 2, an arrangement 101 is illustrated in which a due diligence service provider 102 may assist a financial institution 104 with certain regulatory or legal compliance requirements applicable to its accounts 106, such as due diligence requirements imposed under Section 312 of the USA Patriot Act, for example. In various embodiments, the due diligence service provider 102 may be a transfer agent, an internal or external compliance program of a financial institution, a compliance consultant, or another entity that assists with compliance related business activities or transactions conducted by the financial institution 104. The financial institution 104 may be a "covered financial institution" required to establish a "foreign correspondent account" due diligence program under the Patriot Act. For example, the financial institution 104 may be a mutual fund or another type of investment company which is registered or should be registered with the Securities and Exchange Commission. One or more of the accounts 106 may be defined as foreign correspondent accounts 106A subject to due diligence requirements.

At step 202, a detection process may be initiated for information related to the accounts 106 of the financial institution 104. At step 202A, account 106 data and other information may be communicated by one or more recordkeeping systems 108 operatively associated with the financial institution 104 to a processor 102A of the due diligence service provider 102. In various embodiments, the accounts 106 may be opened, maintained, or used by one or more clients 110 of the financial institution 104. The clients 110 may include, for example, shareholders or customers of a covered financial institution, or other like entities. For a mutual fund 104, for example, shareholder 110 recordkeeping systems 108 may automatically generate files of foreign accounts 106A by electronically interrogating all shareholder account 106 records to detect a variety of system fields and codes associated with foreign accounts 106A. The processor 102A may be a server, for example, or another computer system configured to facilitate electronic data communications with the recordkeeping systems 108. The data may be stored at step 202B in one or more data storage media 102B of the due diligence service provider 102.

At step 202C, the data communicated about the accounts 106 may be reviewed and analyzed to identify foreign correspondent accounts 106A that have been opened or maintained in such a way as to trigger predefined compliance criteria, such as criteria in accordance with due diligence provisions of the Patriot Act, for example. Analysts employed by the due diligence service provider 102 may use various electronic tools to eliminate accounts 106 which do not meet the regulatory criteria for the required due diligence measures. These analysts may eliminate client 110 accounts 106 based on various inspection methods, such as visual inspection and analytical inspection. A visual inspection of the account 106 information may be performed to eliminate accounts 106 that are not associated with foreign financial institutions. An analytical inspection may also be conducted to eliminate additional accounts 106 through the evaluation of data on the recordkeeping systems 108, consideration of information received via third party verification data sources 122, and/or review of imaged documents (e.g., account 106 application). In connection with completion of the detection step 202, account 106 information can be entered at step 202D into a foreign correspondent due diligence database 102C ("FCDD" database 102C) for further investigation and processing. For example, reasons for the elimination of accounts 106 can be documented and stored in the data storage media 102B as evidence of their performance. Various functions of the FCDD database 102C may be directed by a detection module 102D of the due diligence service provider 102.

At step 204, validation of the account 106 information detected at step 202 may be performed, such as in connection with a validation module 102E of the due diligence service provider 102. At step 204A, with regard to accounts 106 that could not be eliminated by the processing involved in step 202, correspondence and/or supplemental applications 132 may be electronically generated by the due diligence service provider 102 and sent to various shareholders or clients 110. A questionnaire may be included within the supplemental application 132 which is designed to clarify whether the client 110 may meet the requirements of a foreign financial institution and which may be used to obtain baseline information to support the risk assessment and monitoring functions described below.

An example of a supplemental application 132 is included in FIGS. 3A through 3E. The supplemental application 132 may include various sections designed to elicit information from clients 110 to assist the due diligence service provider 102 in determining whether a given account 106 should be subjected to the Patriot Act due diligence process. As shown, a name and address section 302 can be used to obtain entity name, headquarters address, and/or majority owner information, for example, from the client 110. A charter or registration section 304 can be used to obtain charter jurisdiction, registration numbers, whether the client 110 is a foreign bank or mutual fund or a foreign office of a United States entity, business classification information, and/or other like information. A nature of business section 306 requires the client 110 to characterize the nature of the business conducted by its institution and to identify those jurisdictions of greatest sales volume. A purpose of account section 308 requests information associated with specific purposes or activities to which the account 106 will be applied, including whether non-U.S. entities will be allowed to direct investment activity of the account 106, for example. An anti-money laundering record section 310 requests information associated with current anti-money laundering regulatory supervision and/or violations of anti-money laundering programs administered by the client 110. An anticipated account activity section 312 requests designation of specific data ranges for items such as volume of trading, volume of redemption transactions, method of subsequent purchases, payment of redemption proceeds, and/or affiliations of alternate payees associated with the account 106. At section 314, an official of the company or institutional client 110 can execute and approve the supplemental application 132.

In various embodiments, a formal letter and/or questionnaire may be sent for accounts 106 that could not be eliminated by the inspection methods as described above. Electronic images or files associated with such letters, questionnaires and/or the applications 132 may be retained and stored in the data storage media 102B and/or the FCDD database 102C. In instances where shareholders or clients 110 fail to return the supplemental applications 132 within a predetermined time frame, one or more follow up requests for information may be generated and sent to the client 110. After a predetermined number of unsuccessful attempts to obtain a response from the client 110, a purchase restriction or other limitations may be placed on the account 106 in the recordkeeping system 108 and written notification of this action may be sent to the client 110.

After receiving the completed supplemental application 132 from a given client 110, analysts of the due diligence service provider 102 may then review the application 132 at step 204B and confirm at step 204C whether the due diligence process (e.g., Patriot Act due diligence process) is applicable to that client 110. In addition, one or more follow-up requests may be sent after the initial communication, at a predetermined interval or intervals, to address scenarios in which the application 132 or questionnaire is returned with incomplete information. After a predetermined number of unsuccessful attempts to obtain a response from the client 110, a purchase restriction or other limitations may be placed on the account 106 in the recordkeeping system 108 and written notification of this action may be sent to the client 110. If it is determined that the due diligence process does not apply, an electronic record of the determination may be recorded in the data storage media 102B. Periodic or non-periodic resolicitations of the application 132 may be performed to obtain and evaluate the status and updated information on accounts 106. However, if it is determined that the due diligence process does apply, then the account 106 may be risk assessed as described below.

At step 206, risk assessments may be performed for accounts 106A identified as being subject to the due diligence process, such as the Patriot Act due diligence process. These risk assessments may be performed in connection with a risk assessment module 102F of the due diligence service provider 102. The due diligence service provider 102 may establish predefined criteria to risk rank foreign correspondent accounts 106A, considering risks relevant to the foreign financial institution's jurisdictions of organization and primary regulatory supervision, stated purpose and anticipated use of account and anti-money laundering record, in addition to information and documents provided by the clients 110. In situations where the completed supplemental application 132 is received from a client 110 and the determination is made that the client 110 does fall within the scope of the final rule, analysts may use a standardized risk ranking score sheet or risk ranking tool to ascertain the level of risk that the client 110 account 106A represents. Depending on the level of risk assigned to a client 110 account 106, certain processes may be initiated to restrict or close the account 106. Accounts 106 which are risk ranked may be assigned a monitoring frequency based on the level of risk. In addition, a periodic re-evaluation of the risk ranking for each applicable client 110 account 106 may be conducted by re-solicitation of the supplemental application 132 and review of the responses to note any changes in status for the account 106.

Upon receipt of a completed application 132 or questionnaire, a record of its receipt may be made along with an electronic image stored in the data storage media 102B for future reference. In connection with risk assessment, responses to the questionnaire in the application 132 may be analyzed at step 206A, then the responses to the questionnaire in the application 132 may be rated and a risk ranking may be assigned or applied to the account 106A at step 206B.

An example of a risk ranking tool that may be used in accordance with certain embodiments of the invention is illustrated in FIGS. 4A through 4E. In this example, the risking ranking tool includes a risk ranking section 402 which permits an analyst of the due diligence service provider 102, for example, to score an account 106 based on numerous risk factors. The tool may include a series of questions designed to assess each account 106, and one or more of the questions may correspond to information obtained from the supplemental application 132 as described above. An indication of the correlation between the question on the tool and corresponding information contained in the application 132 may be included in column 404. A company name search section 406 may be included which contains questions related to whether the client 110 is listed on certain third party verification data sources 122 (e.g., Office of Foreign Assets Control Specially Designated National List or lists maintained by the United States Department of the Treasury). Likewise, a company official name search section 408 and a majority owner name search section 410 provide questions related to officers or owners of clients 110. A company location and organization section 412 includes questions related to the country, territory or other jurisdiction in which the client 110 is located. A majority owner location and organization section 414 includes questions associated with the country, territory or other jurisdiction in which majority owners of clients 110 are located. A company jurisdictional business pursuits section 416 includes questions associated with country, territories or other jurisdictions in which the client 110 conducts business. At section 418, the analyst may determine whether any of the questions in sections 406-416 have been answered with a "yes" which may indicate a "highest" risk ranking for the client 110.

At section 418, if the answers in sections 406-416 are all negative, then one or more additional sections of the risk ranking tool may be evaluated. A company location and organization section 420 includes questions that assess whether the client 110 is on a financial action task force list in association with a country, territory or other jurisdiction. An anti-money laundering record section 422 includes questions related to compliance with and/or violations of anti-money laundering requirements by the client 110. A purpose of account section 424 assesses activities and types of customers that may be permitted for the account 106. At section 426, the analyst may determine whether any of the questions in sections 420-424 have been answered with a "yes" which may indicate a "high" risk ranking for the institution.

At section 426, if the answers in sections 420-424 are all negative, then one or more additional sections of the risk ranking tool may be evaluated. A company location and organization section 428 may be assessed to determine whether the client 110 is associated with a high risk country list maintained by the due diligence service provider 102. A majority owner location and organization section 430 may be used to determine whether a majority owner of a client 110 is located in a jurisdiction associated with the high risk country list. An anti-money laundering record section 432 includes questions associated with anti-money laundering regulatory supervision of the client 110. A company ownership and formation section 434 considers when the client 110 was formed and whether it is privately held or government owned. An anticipated activity associated with account section 436 includes questions related to the types and volume of transactions anticipated to be conducted in the account 106. At section 438, the analyst may assess whether "yes" or "no" answers are applicable to sections 428-436 and generate a total risk score for these sections. If a predetermined risk score is calculated, a risk ranking of "high" or "standard" may be applied to the account 106 accordingly.

It can be seen that embodiments of the invention may provide a multi-tiered, multi-sectional approach to identify and risk assess foreign correspondent accounts 106A. The risk assessment may be documented and recorded in the FCDD database 102C. Also, the risk rating for each account 106A determined to be associated with a foreign financial institution may be also be flagged and recorded in the recordkeeping system 108 at step 206C. At step 206D, the due diligence service provider 102 may notify the financial institution 104 of accounts 106 that have been rated with a heightened risk category. The risk rating can be re-evaluated for each open foreign correspondent account 106 on a periodic basis by resubmitting the supplemental application 132 and the questionnaire to the client 110.

At step 208, each account 106 may also be monitored on a periodic basis in connection with a monitoring module 102G to identify unusual or suspicious activity in view of application of certain risk-based procedures and/or controls. This monitoring activity may include a review of account 106 transaction activity at step 208A, with frequency and/or depth of the review determined, at least in part, by the risk rating of the account 106A. The monitoring attempts to determine if account 106 activities being conducted are suspicious or inconsistent with baseline information regarding client 110 account 106 purpose and anticipated use provided by the client 110. In the event that account 106 activities are deemed to be suspicious or inconsistent with such baseline information, the due diligence server provider 102 and/or the financial institution 104 may take appropriate action such as file a suspicious activity report, suspend transaction activity in the account 106, or close an account 106 due to failure to comply with the due diligence procedures, and/or take other action in situations in which high risk activity regarding an account 106 is identified.

Transaction activity reports may be monitored at step 208A for each foreign correspondent account 106A on a periodic basis or other basis by assigned risk categories in order to detect any unusual or suspicious activity. As part of the monitoring of step 208B, the transaction reports may be reviewed to compare actual activity of each foreign correspondent account 106A against expected activity derived from the shareholder responses on the questionnaire or supplemental application 132. At step 210, in instances in which unusual or potentially suspicious activity is identified or significant variances are observed in comparisons between actual and anticipated activity, the due diligence service provider 102 may prepare and communicate a notification to the financial institution 104. If an account 106 is found to be potentially suspicious or inconsistent (e.g., a significant variance between the anticipated activity and actual activity), then a process may be undertaken to escalate the suspicious account 106 to management and/or an appropriate anti-money laundering officer of the due diligence service provider 102 and/or the financial institution 104.

The current risk assessment of an account 106 may determine future monitoring or information gathering activities to be performed by the due diligence service provider 102. For example, in the case of a standard risk account, an annual review may be performed from the most recently performed due diligence review; in the case of a high-risk account, the review may instead be performed in six months; and, in the case of the highest risk ranking, the review may instead be performed in three months, or on a quarterly basis. Such follow-up review dates may be manually designated in the FCDD database 102C and/or the recordkeeping system 108 by the analyst, and/or the review dates may be automatically generated by the monitoring module 102G, for example.

In addition, in various embodiments, one or more reports describing the risk assessment activity of step 206 and/or the monitoring activity of step 208 may be generated and communicated to management and/or an appropriate anti-money laundering officer of the due diligence service provider 102 and/or the financial institution 104. For example, the due diligence service provider 102 may refer a case to the financial institution 104 when a client 110 who has been identified as a potential or actual foreign correspondent account 106A fails to return or fully complete a due diligence questionnaire or other request for information, or if there is a material deviation between anticipated and actual account 106 activity or other suspicious activity. The financial institution 104 may also have the option to be notified of accounts 106 that have been rated with a heightened risk category.

With reference to FIGS. 5A1 through 12, an example of a system and its operational aspects may be illustrated in association with certain embodiments of the invention, including components such as the FCDD database 102C. On a periodic basis, the recordkeeping system 108 may perform an extract of accounts 106 as defined by a number of criteria such as predefined codes, a first number in the taxpayer identification data, and/or other indicia that promote capture of all foreign correspondent accounts 106A. Once extracted and communicated to the due diligence service provider 102, the account 106 records may be assigned tracking numbers.

As shown in FIGS. 5A1 through 5C2, a form detail record view type of user interface that can be used with various account 106 records is provided. It can be seen that the record view interface permits an analyst of the due diligence service provider 102, for example, to categorize and record a variety of information obtained or uncovered for each account 106 record. For example, the record view interface may include various functionality, such as: a category section 502 (e.g., correspondence ("corro"), independent review, new, pending update, due diligence, need info, or not applicable); a registration information section 504; a foreign account information section 506; an additional address information section 508; an initial search section 510 (including functionality for documenting searches performed); a mailings section 512 (including information and functionality for recording or authorizing initial and subsequent mailings, such as mailings of supplemental applications 132, for example); a questionnaire progress and results section 514; a risk indicator section 516 (e.g., for highest, high, standard, or not applicable rankings); a searches performed section 518; and/or, a corro signoff section 520. As part of the review to determine whether the account is a foreign financial institution, the analyst may perform one or more of: a visual inspection of the account 106 name or address; an analytical inspection, using third party verification data sources 122 (e.g., WorldCheck, Choicepoint, etc.); and/or, a verification that the client 110 name and/or address does not match the OFAC SDN list. Various data shown on the record view interface (e.g., the date a risk assessment was performed, analyst name, or others) may be stored in the data storage media 102B, for example, for future reference or analytical purposes.

With regard to FIG. 6, an example of an account 106 record imported into the FCDD database 102C is shown as a "new" record to be analyzed. For each new record, an analyst determines whether the record is associated with a foreign financial institution account 106. If the analyst decides that the record is not associated with a foreign financial institution account 106, then a "not applicable" status may be applied to the record, examples of which are shown in FIG. 7. The "not applicable" status may include eliminations by visual inspection, analytical inspection (e.g., explainable business existence, investment purpose, etc.), duplicate records, clients 110 that are foreign who have received a risk rating but through further investigation and corroboration with the financial institution 104, are deemed not applicable to Patriot Act due diligence processes, and/or clients 110 that have an authentic United States business address and are doing business through a United States broker.

Figure 8:

However, if the account 106 record is believed to be associated with a foreign financial institution, then the analyst may update the record to an "independent review" status, so that the record can be reviewed by a manager of the due diligence service provider 102, for example. An example of a record assigned to "independent review" status is shown in FIG. 8. If the manager agrees with the determination of the analyst, then the account 106 record may be further updated to a "corro" or "correspondence" status, which will place the record in a queue for a supplemental application 132 to be mailed. Examples of records designated or updated with "corro" status are shown in FIG. 9.

Other status options that can be applied to account 106 records include a "pending update" status (see FIG. 10) and a "need info" status (see FIG. 11). The "pending update" may be applied in situations where an item on a record is referred to the financial institution 104, such as a request for supplemental information, and the record may be effectively placed on hold pending the requested update. The "need info" status may be applied in situations in which more information about the account 106 is needed, and the account 106 record may be placed into a queue for further research, such as by an analyst of the due diligence service provider 102.

With respect to correspondence, such as sending supplemental applications 132 to clients 110, the system can record dates that such communications are sent as well as a tracking number for recording copies of correspondence in an imaging system, for example. The system may also be configured to automatically age and/or flag a record for follow-up (e.g., records 60 days old), so that subsequent communications can be sent if no response to the initial communication is received. After a predetermined period of time with an incomplete response or no response, the analyst may mark the record to reflect a non-responsive client 110 and a high risk rating may automatically be applied to the account 106. In the event that the client 110 responds satisfactorily to the supplemental applications 132 or other information requests, then the analyst may apply the risk ranking tool (as described above—see, e.g., FIGS. 4A through 4E) or other analytical tools to perform a risk assessment for the account 106.

Figure 12:

If management of the due diligence service provider 102 concurs with the risk ranking as determined by the analyst, then a "due diligence" status may be applied to the account 106 record, examples of these records are shown in FIG. 12. In this event, activity or transactions associated with the account 106 may need to be monitored in accordance with the discussion above regarding the monitoring step 208. In addition, the supplemental application 132 and a score sheet for the risk ranking tool (see, e.g., FIGS. 4A through 4E) may be electronically imaged and stored. Also, the risk ranking may be recorded in the recordkeeping system 108.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention.

It is to be understood that the figures and descriptions of the present invention have been simplified to illustrate elements that are relevant for a clear understanding of the present invention, while eliminating, for purposes of clarity, certain other elements. Those of ordinary skill in the art will recognize, however, that these sorts of focused disclosures would not facilitate a better understanding of the present invention, and therefore, a more detailed description of such elements is not provided herein.

Any element expressed herein as a means for performing a specified function is intended to encompass any way of performing that function including, for example, a combination of elements that may perform that function. Furthermore the invention, as may be defined by such means-plus-function claims, resides in the fact that the functionalities provided by the various recited means are combined and brought together in a manner as defined by the appended claims. Therefore, any means that can provide such functionalities may be considered equivalents to the means shown herein.

In general, it will be apparent to one of ordinary skill in the art that various embodiments described herein, or components or parts thereof, may be implemented in many different embodiments of software, firmware, and/or hardware. The software code or specialized control hardware used to implement some of the present embodiments is not limiting of the present invention. For example, the embodiments described hereinabove may be implemented in computer software using any suitable computer software language type such as, for example, C or C++ using, for example, conventional or object-oriented techniques. Such software may be stored on any type of suitable computer-readable medium or media such as, for example, a magnetic or optical storage medium. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present invention based on the description herein with only a reasonable effort and without undue experimentation.

Moreover, the processes associated with the present embodiments may be executed by programmable equipment, such as computers. Software or other sets of instructions that may be employed to cause programmable equipment to execute the processes may be stored in any storage device, such as, for example, a computer system (non-volatile) memory, an optical disk, magnetic tape, or magnetic disk. Furthermore, some of the processes may be programmed when the computer system is manufactured or via a computer-readable medium. Such a medium may include any of the forms listed above with respect to storage devices and may further include, for example, a carrier wave modulated, or otherwise manipulated, to convey instructions that may be read, demodulated/decoded and executed by a computer.

It can also be appreciated that certain process aspects described herein may be performed using instructions stored on a computer-readable medium or media that direct a computer or computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary. A computer-readable medium may further involve one or more data signals transmitted on one or more carrier waves.

A "computer" or "computer system" may be, for example, a wireless or wire line variety of a microcomputer, minicomputer, server, mainframe, laptop, personal data assistant (PDA), wireless e-mail device (e.g., "BlackBerry" trade-designated devices), phone, smart phone, cellular phone, cable box, pager, processor, fax machine, scanner, or any programmable device configured to transmit and receive data over a network. Computer devices disclosed herein may include memory for storing certain software applications used in obtaining, processing and communicating data. It can be appreciated that such memory may be internal or external to the disclosed embodiments. The memory may also include any means for storing software, including a hard disk, an optical disk, floppy disk, ROM (read only memory), RAM (random access memory), PROM (programmable ROM), EEPROM (electrically erasable PROM), and other computer-readable media.

In various embodiments of the present invention disclosed herein, a single component may be replaced by multiple components, and multiple components may be replaced by a single component, to perform a given function or functions. Except where such substitution would not be operative to practice embodiments of the present invention, such substitution is within the scope of the present invention.

While various embodiments of the invention have been described herein, it should be apparent, however, that various modifications, alterations and adaptations to those embodiments may occur to persons skilled in the art with the attainment of some or all of the advantages of the present invention. The disclosed embodiments are therefore intended to include any and all such modifications, alterations and adaptations without departing from the scope and spirit of the present invention as set forth in the appended claims.

What is claimed is:

1. A computer-assisted method for a due diligence service provider to assist a financial institution with a regulatory or statutory compliance requirement, the method comprising:
   receiving with a computer system comprising at least one processor and operatively associated memory, data communicated from at least one recordkeeping system operatively associated with at least one client account of the financial institution, the account data including at least one account associated with a foreign financial institution, wherein the financial institution comprises a mutual fund, wherein the at least one client account is a mutual fund account, and wherein the due diligence service provider also acts as a transfer agent for the mutual fund;
   electronically reviewing the communicated account data with the computer system to identify at least one foreign correspondent account, wherein establishment or maintenance of the foreign correspondent account triggers at least one regulatory or statutory compliance requirement;
   electronically eliminating, with the computer system, account records not associated with a foreign financial institution;
   electronically validating at least part of the account data associated with the at least one foreign correspondent account, with the computer system, wherein the validating comprises:
   transmitting a supplemental application to a client of the financial institution associated with a first foreign correspondent account,
   receiving from the client of the financial institution a completed copy of the supplemental application, wherein the completed copy of the supplemental application comprises data indicating:
   a location of the client;
   an indication of at least one company official of the client;
   charter information describing the client, wherein the charter information comprises at least one of a jurisdiction where the client is chartered, a registration number of the client, and an indication of whether the client is a foreign entity, or a foreign office of a United States entity;
   a description of the nature of business conducted by the client;
   a description of a purpose of the first foreign correspondent account;
   an indication of a money-laundering regulatory scheme governing the client;
   an indication of whether the client has been penalized for money-laundering in the past; and
   anticipated account activity of the first foreign correspondent account, wherein the anticipated account activity comprises at least one of a designation of volume of trading, volume of redemption transactions, method for subsequent purchases, payment of redemption proceeds, or an affiliation of an alternate payee associated with the account;
   determining that the compliance requirement is applicable to the first foreign correspondent account considering the data received from the completed copy of the supplemental application;
   placing a restriction or limitation on the client account if the supplemental application is not communicated to the due diligence service provider; and
   re-evaluating at least one risk ranking for the account data, including re-soliciting the supplemental application from the client;
   performing a risk assessment for the foreign correspondent account using a risk ranking tool;
   electronically applying a risk ranking to the account data, with the computer system based on use of the risk ranking tool;
   with the computer system, periodically comparing transaction activity reports of the first foreign correspondent account to the anticipated account activity, wherein a frequency of the periodic comparing is based at least in part on the applied risk ranking;
   based on the comparing, determining with the computer system that the transaction activity reports differ from the anticipated account activity by more than a predetermined amount;
   reporting the first foreign correspondent account to management of at least one of the financial institution or the due diligence service provider, with the computer system.

2. The method of claim 1, wherein the compliance requirement includes a due diligence requirement under the USA Patriot Act.

3. The method of claim 1, wherein the financial institution comprises a covered financial institution required to establish a foreign correspondent account due diligence program.

4. The method of claim 1, wherein the due diligence service provider includes an internal or external program of the financial institution.

5. The method of claim 1, wherein the due diligence service provider includes a compliance consultant.

6. The method of claim 1, further comprising considering information received from at least one third party verification data source.

7. The method of claim 1, wherein the supplemental application includes a questionnaire designed to obtain information regarding whether the client of the financial institution meets the definition of a foreign financial institution and to obtain baseline information to support the risk assessment step and the monitoring step.

8. The method of claim 1, wherein the supplemental application includes at least a name and address section for obtaining entity name, headquarters address, or majority owner information.

9. The method of claim 1, wherein the supplemental application includes charter or registration section for obtaining at least one or more of charter jurisdiction, a registration number, whether the client is a foreign bank, mutual fund or foreign office of a United States entity, or business classification information.

10. The method of claim 1, wherein the supplemental application includes a nature of business section for characterizing the nature of the business conducted by the client.

11. The method of claim 1, wherein the supplemental application includes a purpose of account section for requesting information associated with specific purposes or activities to which the account will be applied.

12. The method of claim 1, wherein the supplemental application includes an anti-money laundering record section for requesting information associated with current management or violations of anti-money laundering programs administered by the client.

13. The method of claim 1, wherein the supplemental application includes an anticipated account activity section.

14. The method of claim 13, wherein the anticipated account activity section includes at least one of a designation of volume of trading, volume of redemption transactions, method for subsequent purchases, payment of redemption proceeds, or an affiliation of an alternate payee associated with the account.

15. The method of claim 1, wherein the risk ranking tool includes at least one section corresponding to at least one section of the supplemental application.

16. The method of claim 1, wherein the risk ranking tool includes a third party verification data source section, a company official name search section, a majority owner name search section, a company location and organization section, a majority owner location and organization section, a company jurisdictional business pursuits section, an anti-money laundering record section, a purpose of account section, a company ownership and formation section, and an anticipated activity associated with account section.

17. The method of claim 1, wherein monitoring includes reviewing transaction activity for at least one account based, at least in part, on the risk ranking of the account.

18. The method of claim 1, wherein monitoring further includes determining whether activities being conducted for the account are suspicious or inconsistent with baseline information regarding purpose or anticipated use of the account provided in the supplemental application.

19. The method of claim 18, wherein if it is determined that the activities are suspicious or inconsistent with the baseline information, further comprising taking action on the account.

20. The method of claim 19, wherein the action includes one of filing a suspicious activity report, suspending transaction activity, or closing the account.

21. A computer system for assisting a financial institution with a regulatory or statutory compliance requirement, the system comprising:
a computer system comprising at least one processor and operatively associated memory, wherein the memory comprises instructions that, when executed by the at least one processor, cause the computer system to execute:
a detection module configured for:
  a. receiving data communicated from at least one record keeping system operatively associated with at least one client account of the financial institution, the account data including at least one account associated with a foreign financial institution, wherein the financial institution comprises a mutual fund, wherein the at least one client account is a mutual fund account, and wherein the computer system is associated with a transfer agent for the mutual fund;
  b. reviewing the communicated account data to identify at least one foreign correspondent account, wherein establishment or maintenance of the foreign correspondent account triggers at least one regulatory or statutory compliance requirement;
  c. eliminating account records not associated with a foreign financial institution;
a validation module configured for validating at least part of the account data by communicating a supplemental application to a client of the financial institution, wherein validating comprises:
  electronically transmitting a supplemental application to a client of the financial institution associated with a first foreign correspondent account,
  electronically receiving from the client of the financial institution a completed copy of the supplemental application, wherein the completed copy of the supplemental application comprises data indicating:
    a location of the client;
    an indication of at least one company official of the client;
    charter information describing the client, wherein the charter information comprises at least one of a jurisdiction where the client is chartered, a registration number of the client, and an indication of whether the client is a foreign entity, or a foreign office of a United States entity;
    a description of the nature of business conducted by the client;
    a description of a purpose of the first foreign correspondent account;
    an indication of a money-laundering regulatory scheme governing the client;
    an indication of whether the client has been penalized for money-laundering in the past; and
    anticipated account activity of the first foreign correspondent account, wherein the anticipated account activity comprises at least one of a designation of volume of trading, volume of redemption transactions, method for subsequent purchases, payment of redemption proceeds, or an affiliation of an alternate payee associated with the account;

determining that the compliance requirement is applicable to the first foreign correspondent account considering the data received from the completed copy of the supplemental application;

placing a restriction or limitation on the client account if the supplemental application is not communicated to the due diligence service provider; and re-evaluating at least one risk ranking for the account data, including re-soliciting the supplemental application from the client;

a risk assessment module configured for
  a. performing a risk assessment for the account data;
  b. applying a risk ranking to the foreign correspondent account data based on use of the risk ranking tool; and, a monitoring module configured to:
  periodically compare transaction activity reports of the first foreign correspondent account to the anticipated account activity, a frequency of the periodic comparing is based at least in part on the risk ranking applied by the risk assessment module;
  determine that the transaction activity reports differ from the anticipated account activity by more than a predetermined amount; and
  report the first foreign correspondent account to management of at least one of the financial institution or the transfer agent.

22. A computer-assisted method for a due diligence service provider to assist a financial institution with a regulatory or statutory compliance requirement, the method comprising:

receiving with a computer system comprising at least one processor and operatively associated memory, data communicated from at least one recordkeeping system operatively associated with at least one client account of the financial institution, the account data including at least one account associated with a foreign financial institution, wherein the financial institution comprises a mutual fund, wherein the at least one client account is a mutual fund account, and wherein the due diligence service provider also acts as a transfer agent for the mutual fund;

electronically reviewing the communicated account data with the computer system to identify at least one foreign correspondent account, wherein establishment or maintenance of the foreign correspondent account triggers at least one regulatory or statutory compliance requirement;

electronically eliminating, with the computer system, account records not associated with a foreign financial institution;

electronically validating at least part of the account data associated with the at least one foreign correspondent account, with the computer system, wherein the validating comprises:

transmitting a supplemental application to a client of the financial institution associated with a first foreign correspondent account, receiving from the client of the financial institution a completed copy of the supplemental application, wherein the completed copy of the supplemental application comprises data indicating:
    a location of the client;
    an indication of at least one company official of the client;
    charter information describing the client, wherein the charter information comprises at least one of a jurisdiction where the client is chartered, a registration number of the client, and an indication of whether the client is a foreign entity, or a foreign office of a United States entity;
    a description of the nature of business conducted by the client;
    a description of a purpose of the first foreign correspondent account;
    an indication of a money-laundering regulatory scheme governing the client;
    an indication of whether the client has been penalized for money-laundering in the past; and
    anticipated account activity of the first foreign correspondent account, wherein the anticipated account activity comprises at least one of a designation of volume of trading, volume of redemption transactions, method for subsequent purchases, payment of redemption proceeds, or an affiliation of an alternate payee associated with the account;

determining that the compliance requirement is applicable to the first foreign correspondent account considering the data received from the completed copy of the supplemental application;

placing a restriction or limitation on the client account if the supplemental application is not communicated to the due diligence service provider; and re-evaluating at least one risk ranking for the account data, including re-soliciting the supplemental application from the client;

performing a risk assessment for the first foreign correspondent account data using a risk ranking tool wherein performing the risk assessment comprises:
  conditioned upon at least one of (i) the client, (ii) the at least one company official of the client, (iii) the majority owner of the client, (iv) the location of the client, (v) the location of the majority owner or (vi) the description of the business conducted by the client being listed on at least one of a plurality of third party verification data sources indicating a highest level of risk, classifying the first foreign correspondent account in a first risk ranking;
  conditioned upon at least one of (i) the location of the client being listed on at least one of a second plurality of third party verification data sources, (ii) the client having received a previous penalty for money laundering, or (iii) the structure of the foreign correspondent account having at least one of a predefined set of features, then classifying the first foreign correspondent account in a second risk ranking indicating a lower level of risk than the first risk ranking;

periodically comparing transaction activity reports of the first foreign correspondent account to the anticipated account activity with the computer system, wherein a frequency of the periodic comparing is at least in part on the applied risk ranking;

determining that the transaction activity reports differ from the anticipated account activity by more than a predetermined amount; and reporting the first foreign correspondent account to management of at least one of the financial institution or the due diligence service provider with the computer system.

* * * * *

UNITED STATES PATENT AND TRADEMARK OFFICE
CERTIFICATE OF CORRECTION

PATENT NO.        : 7,930,228 B1
APPLICATION NO.   : 12/019964
DATED             : April 19, 2011
INVENTOR(S)       : Hawkins et al.

It is certified that error appears in the above-identified patent and that said Letters Patent is hereby corrected as shown below:

Col. 15, Line 14; delete "data"

Signed and Sealed this
Twentieth Day of December, 2011

David J. Kappos
*Director of the United States Patent and Trademark Office*